Nov. 20, 1923
E. T. SCHAVEY
DRIVE MECHANISM FOR SPEEDOMETERS
Filed Jan. 18, 1923
1,474,557
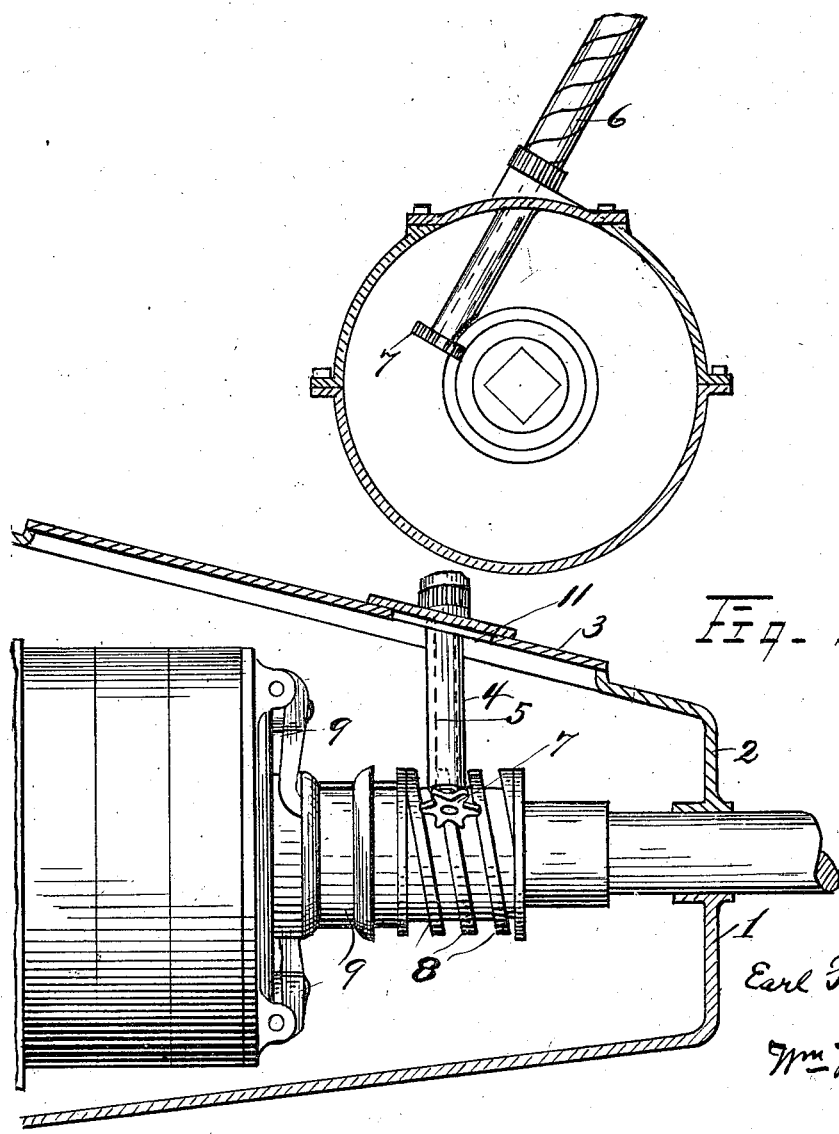

Patented Nov. 20, 1923.

1,474,557

UNITED STATES PATENT OFFICE.

EARL T. SCHAVEY, OF GRAND LEDGE, MICHIGAN.

DRIVE MECHANISM FOR SPEEDOMETERS.

Application filed January 18, 1923. Serial No. 613,555.

*To all whom it may concern:*

Be it known that I, EARL T. SCHAVEY, a citizen of the United States, and resident of Grand Ledge, in the county of Eaton and State of Michigan, have invented certain new and useful Improvements in Drive Mechanism for Speedometers, of which I hereby declare the following to be a full, clear, and exact description, such as will enable others skilled in the art to which it appertains to make and use the same.

The objects of the invention are to provide mechanism for operating a speedometer which is capable of attachment to a Ford car without the use of brackets or additional parts, and comprises an operating shaft and pinion for the speedometer, which are secured to the cover of the door of the transmission cover in such a manner that the pinion will be engaged by and operated by the revolution of the clutch actuating spring, which is sleeved over the drive shaft of the machine.

The device comprises the combination and arrangement of parts and construction of details hereinafter described, illustrated in the accompanying drawings, and specifically pointed out in the claims.

In the accompanying drawings, Fig. 1 is a transverse section of the transmission case, its cover and the door for the cover, showing the clutch spring and pinion for actuating the speedometer; Fig. 2 is a longitudinal section thereof.

In these views, 1 is the casing, 2 the cover therefor, and 3 the door.

Upon this door is positioned a journal bearing, 4, in which revolves the speedometer drive shaft, 5, a portion of which is flexible at 6.

A pinion at 7 upon this shaft, engages the coils, 8, of the clutch-operating spring for the clutch, 9, which intermesh therewith.

12 is the drive shaft, upon which the spring, 8, is coiled.

In this manner, when the clutch, 9, is thrown to revolve the shaft, the revolution of the spring, 8, which revolves therewith, will operate the pinion, 7, and its shaft.

The door may be provided with an opening, 11, if desired, through which the journal bearing, 4, may be inserted, or the bearing may be integral with the door.

When the engine is running idle, the drive shaft and spring will not revolve, but when the engine is engaged with the drive shaft at any and all speeds, the drive shaft and spring will revolve and operate the pinion and speedometer.

I claim:—

1. The combination with the drive shaft of an explosion engine, the transmission mechanism, a clutch for connecting the shaft with said transmission mechanism, a coiled spring sleeved over said shaft for operating said clutch, a pinion having its teeth intermeshed with the coils of said spring and driving mechanism for a speedometer operatively connected with said pinion.

2. The combination with a driving shaft, a clutch thereon, and a spring coiled upon said shaft for operating said clutch, a pinion intermeshing with said spring, a speedometer and a flexible shaft operatively connecting said speedometer and pinion.

3. In a device of the character described a drive shaft, a clutch thereon, a spring coiled on said shaft for operating said clutch, a pinion operated by said spring, a casing, a cover therefor and a shaft for said pinion journalled in said cover.

4. In a device of the character described a drive shaft, a clutch thereon, a spring coiled on said shaft for operating said clutch, a pinion operated by said spring, a casing, a cover therefor and a shaft for said pinion journalled in said cover, a speedometer and a flexible shaft operatively connecting said speedometer and said pinion shaft.

5. In a motor car, in combination a gear case, driving shaft, and clutch of said car, and operating spring for said clutch, said spring being coiled upon said shaft, a cover for said casing, a journal bearing therein, a shaft revolvable in said journal bearing, a pinion on said last mentioned shaft, said pinion operatively engaging with said coiled spring, a speedometer and an operative connection between said pinion shaft and said speedometer.

In testimony whereof, I hereunto set my hand this 6 day of January, 1923.

EARL T. SCHAVEY.

In presence of—
WM. M. MONROE,
TED W. ULMAN.